United States Patent [19]
Lee et al.

[11] Patent Number: 5,629,514
[45] Date of Patent: May 13, 1997

[54] CRITICAL ANGLE FOCUS ERROR DETECTOR

[75] Inventors: Chul-woo Lee, Seoul; Chong-sam Chung, Sungnam; Jang-hoon Yoo; Kyung-hwa Rim, both of Seoul, all of Rep. of Korea

[73] Assignee: Samsung Electronics Co., Ltd., Kyungki-do, Rep. of Korea

[21] Appl. No.: 458,165

[22] Filed: Jun. 2, 1995

[30] Foreign Application Priority Data

Nov. 29, 1994 [KR] Rep. of Korea .................. 94-31841

[51] Int. Cl.$^6$ .................. G01J 1/20; G11B 7/00
[52] U.S. Cl. .................. 250/201.5; 250/208.2; 369/44.41
[58] Field of Search .................. 250/201.5, 201.4, 250/201.2, 201.6, 201.7, 201.8, 208.2, 214 R, 216; 369/44.11, 44.12, 44.14, 44.15, 44.16, 44.22, 44.41

[56] References Cited

U.S. PATENT DOCUMENTS

| | | | |
|---|---|---|---|
| 5,243,585 | 9/1993 | Hoshino et al. | 250/201.5 |
| 5,353,267 | 10/1994 | Katayama | 250/201.5 |
| 5,404,490 | 4/1995 | Matsubayashi et al. | 250/201.5 |
| 5,453,607 | 9/1995 | Ando et al. | 250/201.5 |
| 5,495,461 | 2/1996 | Komma et al. | 250/201.5 |

*Primary Examiner*—Edward P. Westin
*Assistant Examiner*—John R. Lee
*Attorney, Agent, or Firm*—Leydig, Voit & Mayer

[57] ABSTRACT

A focus error detector for detecting a signal representing a degree of a focus error of an objective lens with respect to an optical disk in an optical pickup, in order to eliminate errors due to an optical axis shift or tilt of the reflected light reflected from the optical disk, includes a diffraction device for diffracting and splitting the reflected light reflected. The focus error detector a critical angle reflector having critical angle reflecting planes for reflecting the two diffracted light rays at two critical angles, two bi-segmented photo-detectors for receiving the two diffracted light rays reflected from the critical angle reflector, respectively, and detecting signals depending on the received light amount, and a circuit for differentiating and summing each signal of the two bi-segmented photo-detectors so as to offset the light amount difference due to the tilt or shift of the reflected light and outputting a desired signal. Therefore, only an original focus error signal is output, irrespective of an optical shift or tilt of the reflected light, so that malfunction of the optical pickup is prevented and clean recording and reproduction is enabled.

3 Claims, 5 Drawing Sheets

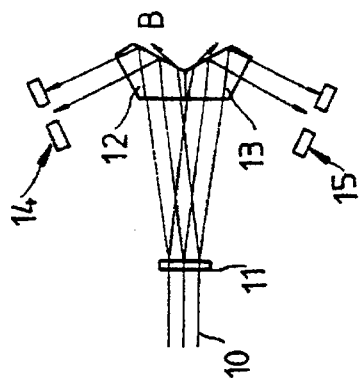
FIG. 5C
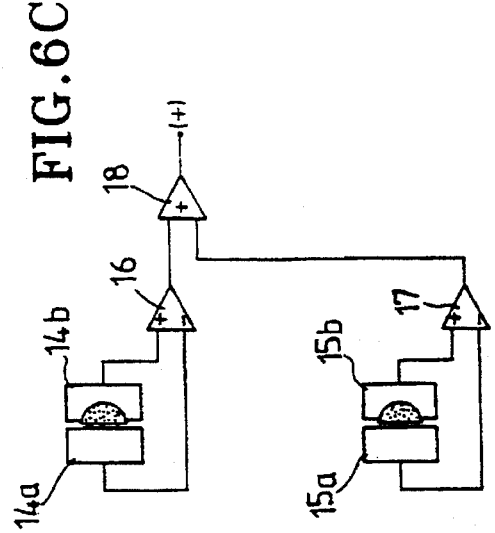
FIG. 6C
FIG. 5B
FIG. 6B
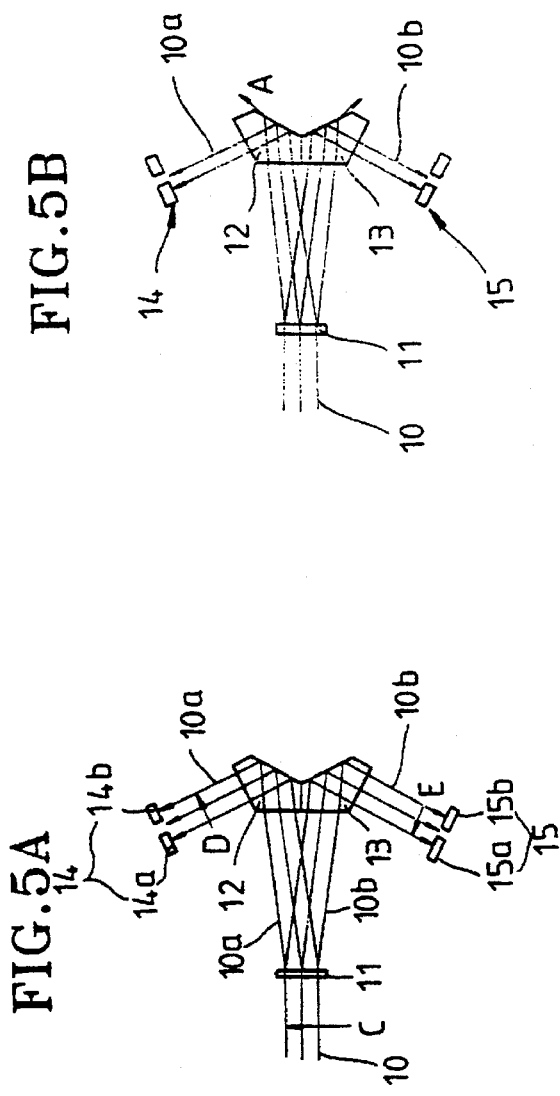
FIG. 5A
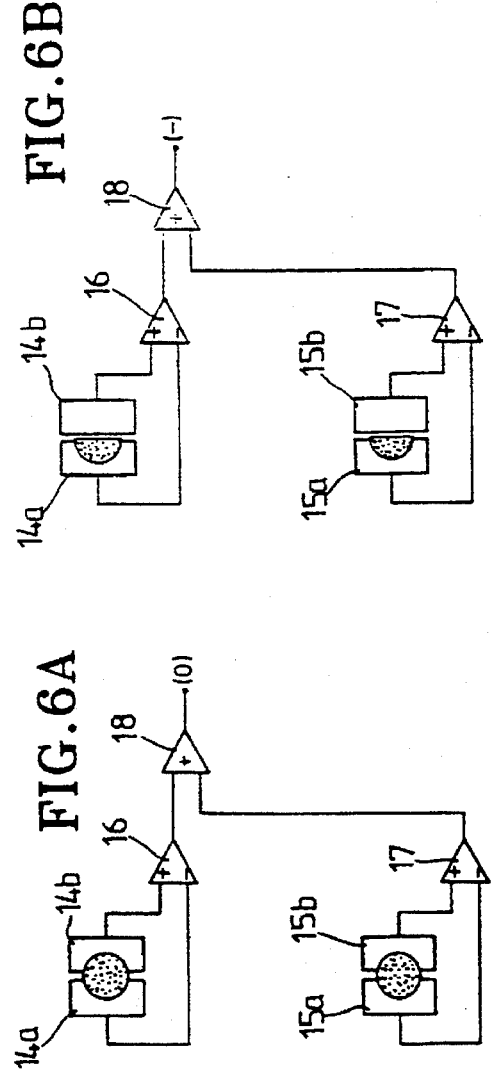
FIG. 6A

CRITICAL ANGLE FOCUS ERROR DETECTOR

BACKGROUND OF THE INVENTION

The present invention relates to a focus error detector for detecting a signal representing a degree of a focus error of an objective lens with respect to an optical recording medium in an optical pickup for recording and/or reproducing information by projecting light onto the optical recording medium, and more particularly, to a focus error detector based on a critical angle method.

The critical angle method is well known as a method using a critical angle prism as a means for detecting a focus error in a recording and/or reproducing optical pickup. The optical structure of an optical pickup adopting a focus error detector based on the conventional critical angle method is shown in FIG. 1.

Referring to FIG. 1, the light radiated from a laser diode 1 used as a light source is collimated by means of a collimating lens 2 and then passes through a beam splitter 3 to then be incident to an objective lens 4. Thereafter, the light is focused onto an optical disk 5 by objective lens 4. After the reflected light from optical disk 5 is collimated again via objective lens 4, the light is reflected in beam splitter 3 to travel toward a critical angle prism 6 and be reflected on a critical plane 6a of critical angle prism 6 to ultimately reach a photo-detector 7. A differential amplifier 8 differentiates signals from split sections 7a and 7b of photo-detector 7. At this time, the signals of differential amplifier 8 are varied in their polarities and magnitudes according to the distance between objective lens 4 and optical disk 5 and the degree of focus errors of objective lens 4, which is shown in FIGS. 2A–2C and 3A–3C in detail.

FIG. 2A shows an on-focus state, that is, a state where optical disk 5 is on a focal plane of objective lens 4. At this time, the reflected light 9 which is collimated is totally reflected on the critical plane 6a of critical angle prism 6. Therefore, as shown in FIG. 3A, the reflected light 9 is equally received by both split sections 7a and 7b of photo-detector 7. The signal value of differential amplifier 8 becomes zero.

However, if optical disk 5 deviates from the focal plane of objective lens 4, the reflected light 9 reflected from optical disk 5 is either converged or diverged, as shown in FIGS. 2B and 2C. At this time, the reflected light amount is reduced at a point A or B on the critical plane 6a of critical angle prism 6. Therefore, as shown in FIGS. 3B and 3C, the reflected light 9 is received at split section 7a or 7b of photo-detector 7, as a semicircular pattern. The signal of differential amplifier 8 is output as a negative or positive value.

In the meantime, for example, if the optical axis of the reflected light is tilted or shifted horizontally due to the optical disk vibration or changes thereto over time, the reflection efficiency of critical angle prism for the reflected light is varied. Therefore, in this case, even if optical disk is positioned on the focal plane of objective lens, the light amount received by two split sections of photo-detector becomes different. Finally, the signal value of differential amplifier becomes a value other than zero. That is, since the focus error detector based on the conventional critical angle method regards the shift or tilt of the optical axis of reflected light as an error, the optical pickup experiences frequent malfunction.

SUMMARY OF THE INVENTION

It is an object of the present invention to provide a focus error detector by which an error causing malfunction of an optical pickup is not generated, by eliminating a signal variation depending on the change in light amount on a photodetector due to an optical axis shift or tilt of the reflected light.

To accomplish the above object, the present invention provides a focus error detector for detecting a focus error of an objective lens which focuses the incident collimated light onto an optical disk, comprising: a diffraction device for diffracting the reflected light reflected from the optical disk and passing through the objective lens into two diffracted light rays; critical angle reflecting means for reflecting the two diffracted light rays at two critical angles; two bi-segmented photo-detectors for receiving the two diffracted light rays reflected from the critical angle reflecting means, respectively, and detecting signals depending on the received light amount; and circuit means for differentiating and summing signals detected by the two bi-segmented photo-detectors so as to offset the light amount difference due to the tilt or shift of the reflected light and outputting a signal representing the degree of the focus error.

Therefore, the present invention allows detection of only an original focus error of an objective lens with respect to an optical disk, irrespective of the tilt or shift of an optical axis of reflected light, due to an optical disk vibration or changes thereto over time. Thus, no malfunction of an optical pickup occurs, so that the operation of the optical pickup is stabilized and clean recording and reproduction is enabled.

BRIEF DESCRIPTION OF THE DRAWINGS

The above objects and advantages of the present invention will become more apparent by describing in detail a preferred embodiment thereof with reference to the attached drawings in which:

FIGS. 3A to 3C illustrate the principle of detecting a focus error in the conventional focus error detector, in which FIG. 3A is a schematic view for an on-focus state, FIG. 3B is a schematic view for the state when the optical disk is positioned near the focal plane, and FIG. 3C is a schematic view for the state when the optical disk is positioned far from the focal plane;

FIG. 5A is a schematic view of the focus error detector when the optical disk is positioned on the focal plane for an on-focus state, FIG. 5B is a schematic view for the state when the optical disk is positioned near the focal plane, and FIG. 5C is a schematic view for the state when the optical disk is positioned far from the focal plane;

FIGS. 6A to 6C show the pattern of light ray 5 on photodetectors corresponding to FIGS. 5A–5C, respectively.

DETAILED DESCRIPTION OF THE INVENTION

Figure 1:
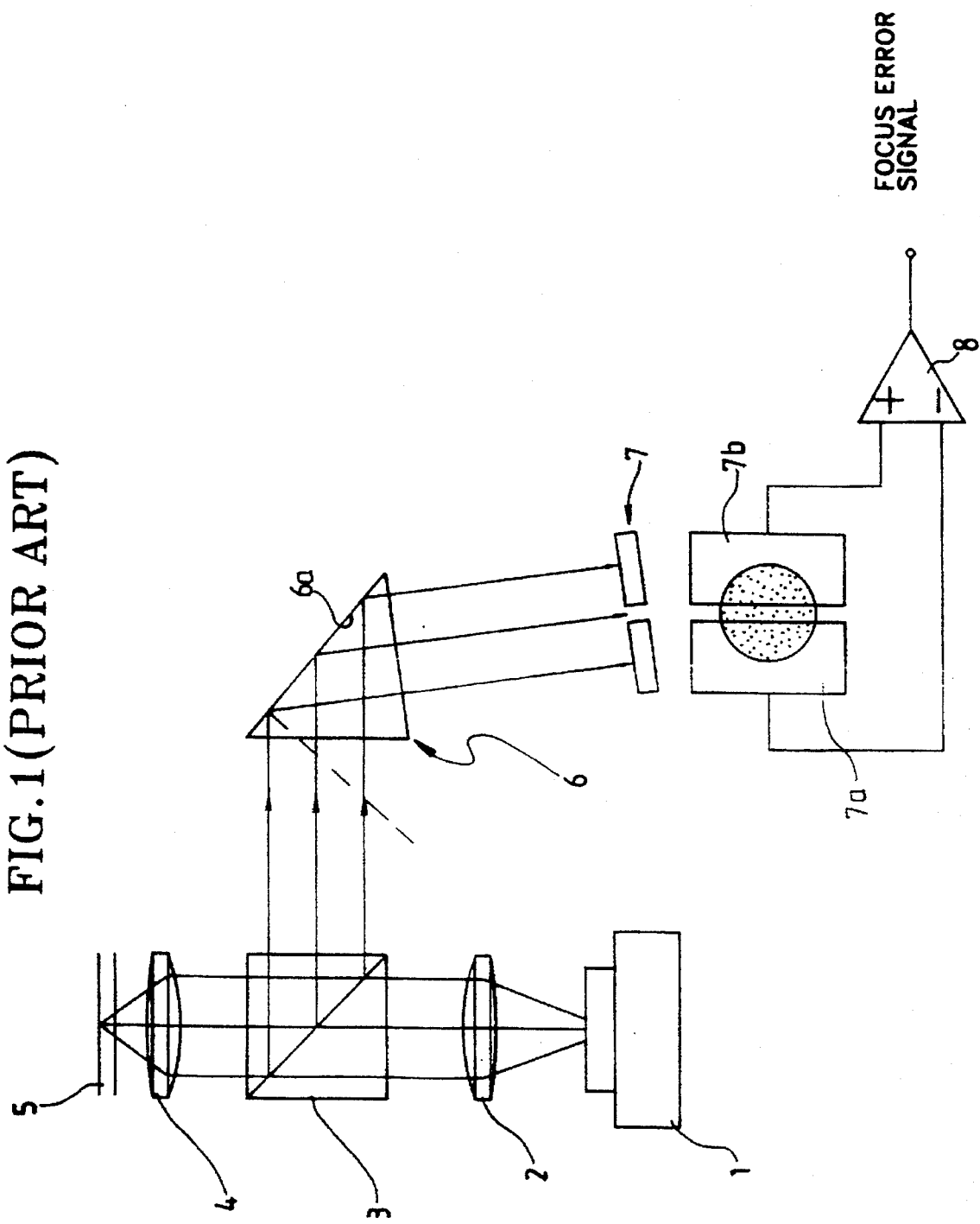
FIG. 1 is a schematic view showing an optical construction of a focus error detector by a conventional critical angle method.
Figure 2A:
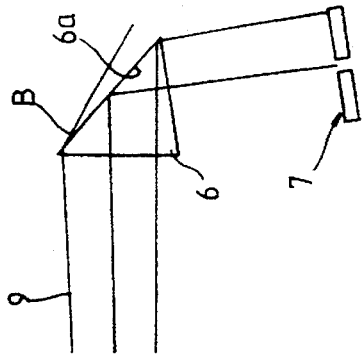
FIGS. 2A to 2C are graphs showing changes of reflected light rays depending on the incident angles of a critical angle prism.
Figure 2B:
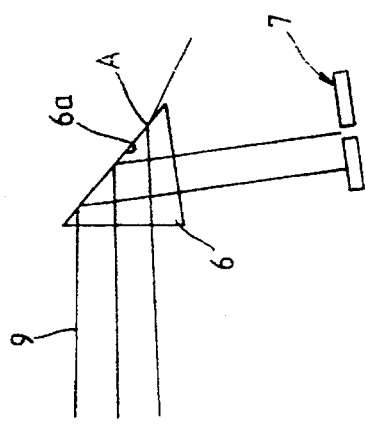
Figure 2C:
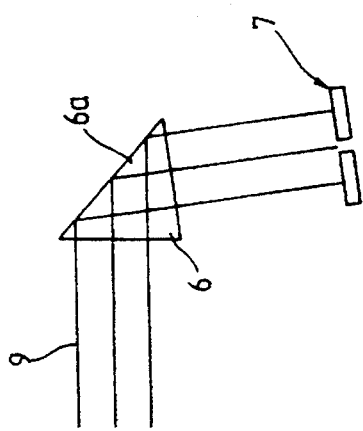
Figure 3A:
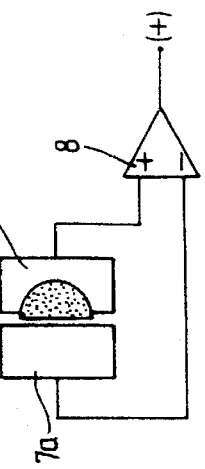
Figure 3B:
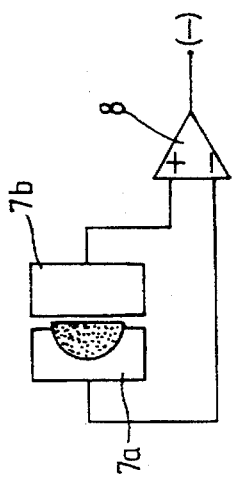
Figure 3C:
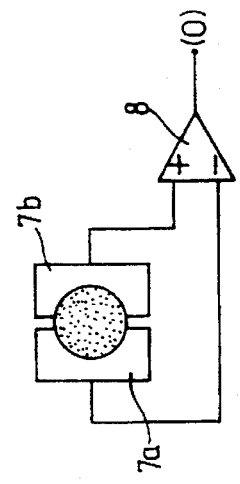
Figure 4:
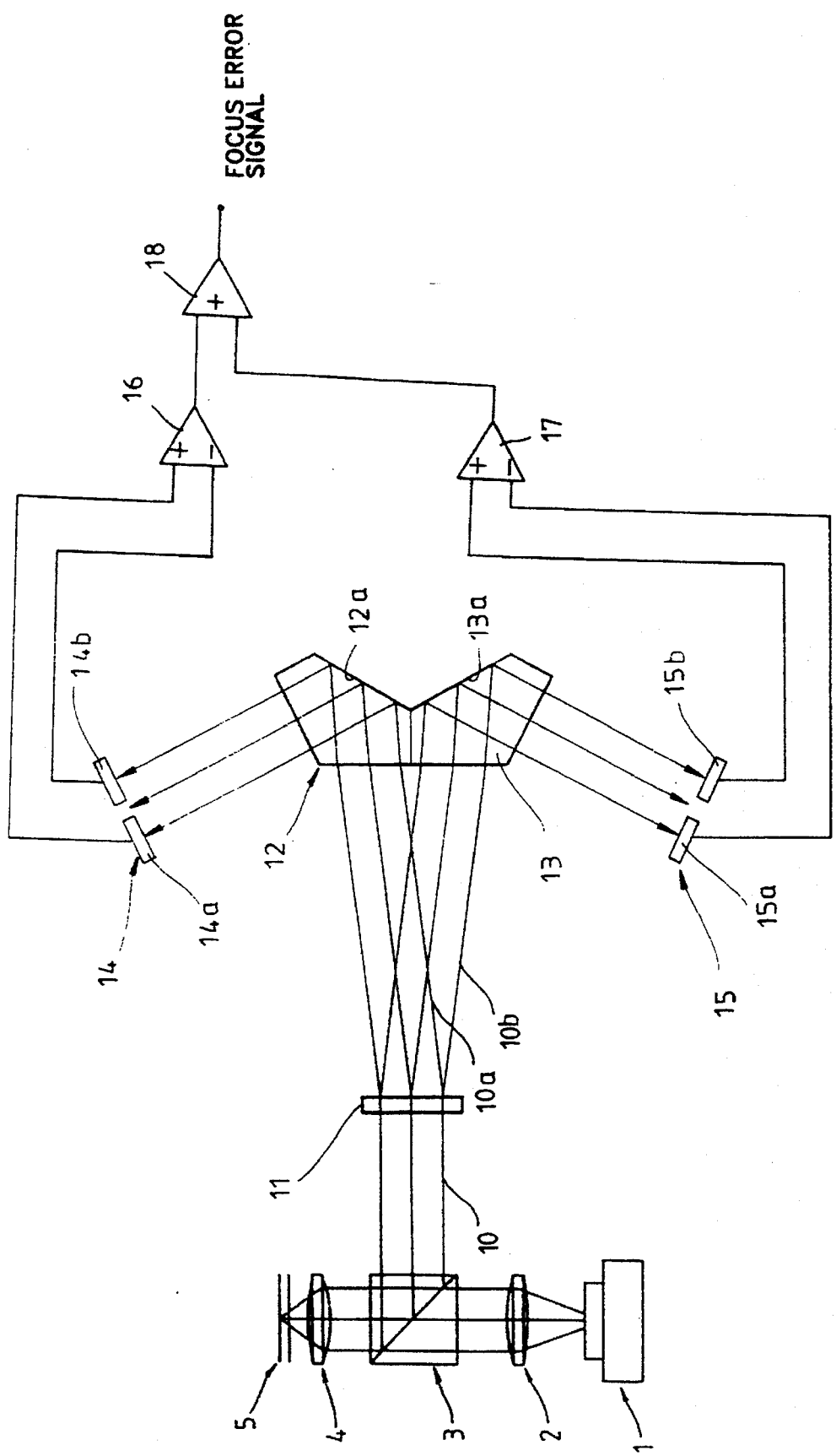
FIG. 4 is a schematic view of a focus error detector according to the present invention.
Figure 7A:
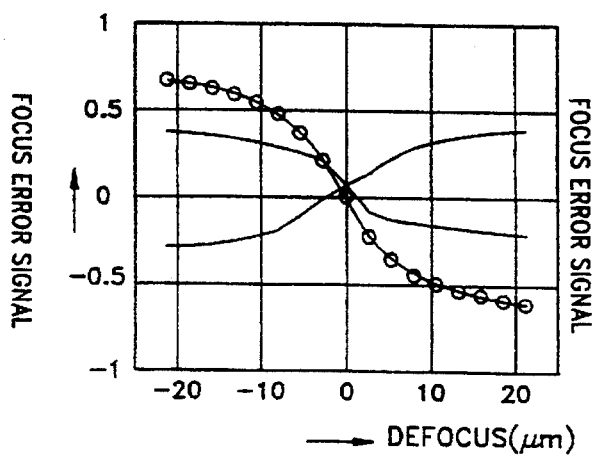
FIGS. 7A to 7D are graphs showing calculated values of a focus detecting signal for a focus error signal detected by the focus error detector according to the present invention, under each condition.
Figure 7B:
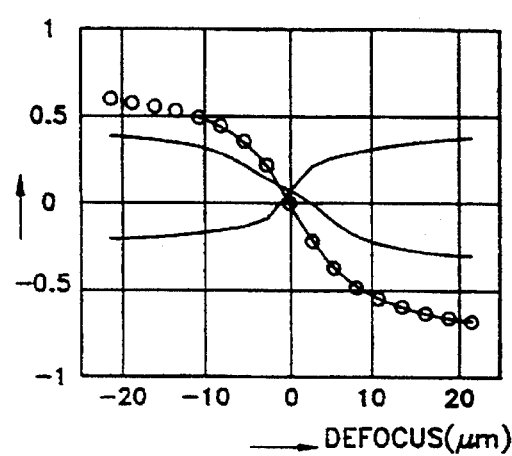
Figure 7C:
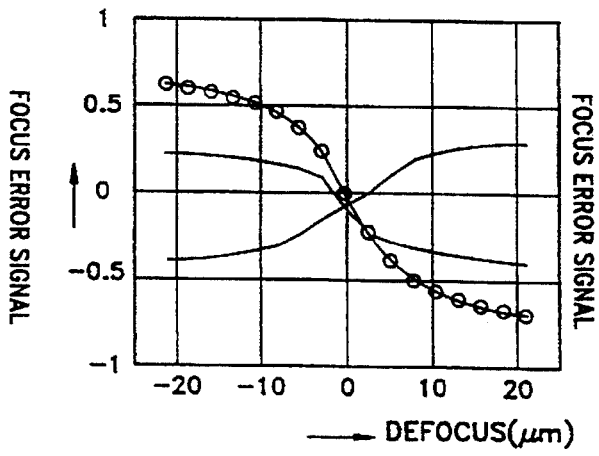
Figure 7D:
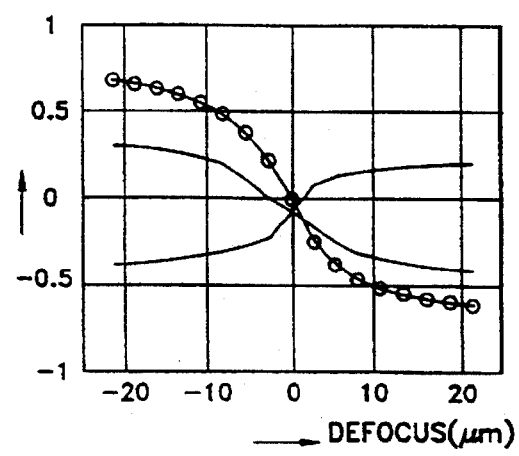

In FIG. 4, the optical pickup includes a laser diode 1, a collimating lens 2, a beam splitter 3 and an objective lens 4, like a conventional optical pickup. The focus error detector according to an embodiment of the present invention provided in the optical pickup is constituted by a diffraction device 11 for diffracting the reflected light 10 reflected from beam splitter 3 into at least two light rays, i.e., a positive first-order light ray 10a and a negative first-order light ray 10b, two critical angle prisms 12 and 13 installed along an optical path of the first-order light rays 10a and 10b, two bi-segmented photo-detectors 14 and 15 for receiving the first-order light rays 10a and 10b passing through the two critical angle prisms 12 and 13, respectively, two differential amplifiers 16 and 17 for differentiating signals of bi-segmented photo-detectors 14 and 15, respectively, and a summing amplifier 18 for summing the signals of differential amplifiers 16 and 17. Here, 12a and 13a represent each critical angle reflecting plane of the critical angle prisms 12 and 13, and 14a, 14b, 15a and 15b represent each split section for bi-segmented photo-detectors 14 and 15.

That is, in this embodiment, the reflected light 10 passing through objective lens 4 and beam splitter 3 after being reflected from optical disk 5, is separated into the positive and negative first-order light rays 10a and 10b in diffraction device 11. Then, the positive first-order light ray 10a travels toward critical angle prism 12 and the negative first-order light ray 10b travels toward critical angle prism 13. The first-order light rays 10a and 10b are reflected from critical angle reflecting planes 12a and 13a of the respective critical angle prisms 12 and 13, respectively, to reach bi-segmented photo-detectors 14 and 15. At this time, differential amplifiers 16 and 17 differentiate signals detected in sections 14a, 14b, 15a and 15b of bi-segmented photo-detectors 14 and 15 each connected thereto. Summing amplifier 18 sums the outputs of differential amplifiers 16 and 17 and outputs the result.

FIG. 5A shows the case when optical disk 5 is positioned on the focal plane of objective lens 4. In this case, the respective ±1st-order light rays 10a and 10b passing through diffraction device 11 become symmetrical with respect to the reflected light 10 incident to diffraction device 11 and are totally reflected on critical angle reflecting planes 12a and 13a of critical angle prisms 12 and 13. Therefore, as shown in FIG. 6A, the ±1st-order light rays 10a and 10b are evenly received by split sections 14a, 14b, 15a and 15b of bi-segmented photo-detectors 14 and 15. At this time, the outputs of differential amplifiers 16 and 17 and summing amplifier 18 are all zero.

In the state as shown in FIG. 5A, if the optical axis of the reflected light 10 is tilted or shifted in the direction of "C" as shown, the +1st-order light ray 10a is shifted in the direction of "D", i.e., the direction from split section 14a of photo-detector 14 to split section 14b thereof. The −1st-order light ray 10b is shifted in the direction of "E", i.e., the direction from split section 15b of photo-detector 15 to split section 14a thereof. In other words, the light amount received by split section 14a of photo-detector 14 is decreased and the light amount received by split section 14b is relatively increased. Also, the light amount received by split section 15a of photo-detector 15 is increased and the light amount received by split section 15b is relatively decreased. However, the detected signals of the respective split sections 14a, 14b, 15a and 15b depending on the light amount variation due to its relative decrease and increase are offset by differential amplifiers 16 and 17 and summing amplifier 18. Therefore, no error is produced by the tilt or shift of the reflected light.

FIGS. 5B and 5C illustrate the cases when the optical disk is positioned beyond the focal plane of the objective lens and on the near side thereof, respectively. In these cases, the reflected light 10 (rays 10a and 10b) is diverged or converged. All of the positive first-order light rays 10a and 10b are not totally reflected from points A and B of critical angle reflecting planes 12a and 13a for critical angle prisms 12 and 13 but some of the reflected rays are transmitted. Therefore, as shown in FIGS. 6B and 6C, the first-order light rays 10a and 10b are landed on sections 14a and 15a of photo-detectors 14 and 15 or on sections 14b and 15b thereof, respectively, in a semicircular pattern. In this cases, the outputs of differential amplifiers 16 and 17 and summing amplifier 18 become negative or positive accordingly, i.e., a non-zero value.

Next, FIGS. 7A to 7D are graphs showing calculated values of a focal point detecting curve by a focus error detector according to the present invention. In each graph, the focus error signal is indicated with a series of plotted points (represented as circles) and the signal detected in each split section of photo-detectors for receiving the reflected light through critical angle prisms is indicated as a solid line. FIGS. 7A to 7D show cases when the optical axis tilt is −2' (minus two minutes) and optical axis shift is 0.3 mm, the optical axis tilt is +2' and optical axis shift is −0.3 mm, the optical axis tilt is −2' and optical axis shift is 0.3 mm, and the optical axis tilt is +2' and optical axis shift is 0.3 mm, respectively.

According to the focal point signal detecting curve shown on these graphs, irrespective of the optical axis tilt or shift, the defocus amount of the objective lens is substantively zero at a point where the signal value is zero; that is, no error is produced due to the tilt and shift.

As described above, the present invention allows detection of only an original focus error of an objective lens with respect to an optical disk, irrespective of an optical axis tilt or shift of reflected light, due to an optical disk vibration or changes thereto over time. Malfunction of an optical pickup does not occur so that the operation of the optical pickup is stabilized. Also, clean recording and reproduction is enabled.

What is claimed is:

1. A focus error detector for detecting a focus error of an objective lens which focuses incident collimated light onto an optical disk, said focus error detector comprising:

a diffraction device for diffracting reflected light reflected from said optical disk and passed through said objective lens into first and second diffracted light rays;

critical angle reflecting means for reflecting said first and second diffracted light rays at first and second critical angles, respectively;

first and second bi-segmented photo-detectors for receiving said first and second diffracted light rays reflected from said critical angle reflecting means, respectively, and for detecting signals depending on an amount of light received; and circuit means including first and second differential amplifiers for differentiating the signals detected by said first and second bi-segmented photodetectors and for generating respective output signals, said circuit means further including a summing amplifier connected to the first and second differential amplifiers for summing the output signals of the differential amplifiers so as to offset a light amount difference due to tilt or shift of the reflected light rays and for outputting a signal representing a degree of focus error.

2. A focus error detector as claimed in claim 1, wherein said critical angle reflecting means includes first and second critical angle prisms having first and second critical angle reflecting planes on which at least a portion of the first and second diffracted light rays are transmitted.

3. A focus error detector as claimed in claim 1, wherein the first and second diffracted light rays are symmetrically positioned with respect to an axis of the reflected light incident onto said diffraction device.

* * * * *